2 Sheets—Sheet 1.

F. A. HUBEL.

Machine for Cutting off Gelatine Capsules.

No. 8,440. Reissued Oct. 1, 1878.

Attest:
A. Barthel
N. T. Sprague

Inventor:
F. A. Hubel
By Atty
Thos. S. Sprague

THE NORRIS PETERS CO., PHOTO-LITHO., WASHINGTON, D. C.

F. A. HUBEL.
Machine for Cutting off Gelatine Capsules.
No. 8,440. Reissued Oct. 1, 1878.
Fig. 3
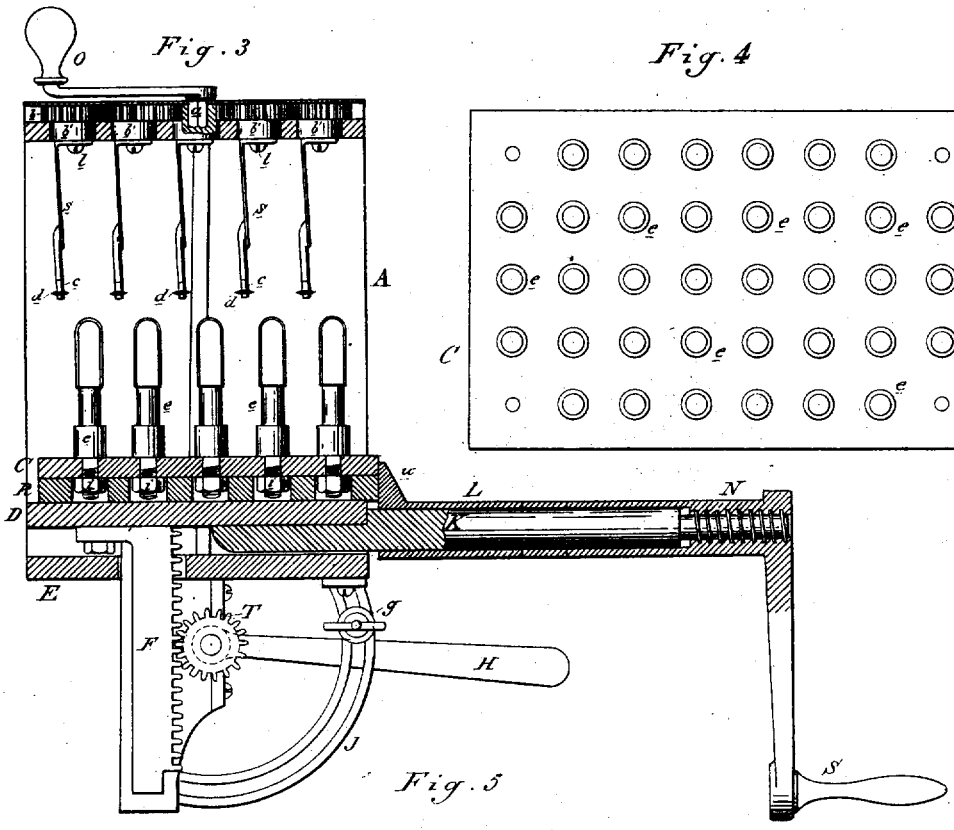
Fig. 4
Fig. 5
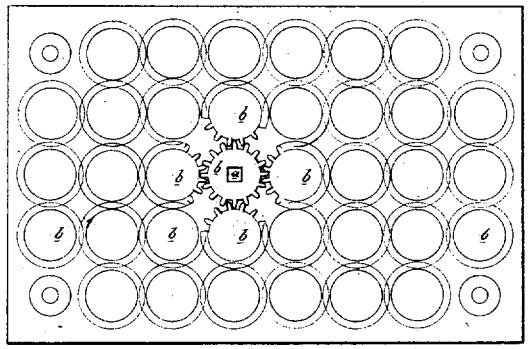
Fig. 6
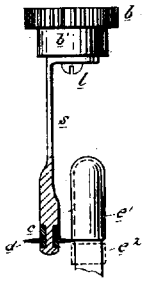
Attest:
A. Barthel
N. Sprague
Inventor:
F. A. Hubel
By Atty
Thos. S. Sprague
THE MORRIS PETERS CO., PHOTO-LITHO., WASHINGTON, D. C.

UNITED STATES PATENT OFFICE.

FREDERICK A. HUBEL, OF DETROIT, MICHIGAN.

IMPROVEMENT IN MACHINES FOR CUTTING OFF GELATINE CAPSULES.

Specification forming part of Letters Patent No. 187,279, dated February 13, 1877; Reissue No. 8,440, dated October 1, 1878; application filed August 17, 1878.

*To all whom it may concern:*

Be it known that I, FREDERICK A. HUBEL, of Detroit, in the county of Wayne and State of Michigan, have invented an Improvement in Machines for Cutting Off Gelatine Capsules, of which the following is a specification:

The nature of my invention relates to certain new and useful improvements in machines employed to cut off at any required and uniform length empty gelatine capsules, preparatory to their removal from the molds upon which they are formed.

The invention consists in the peculiar construction, arrangement, and operation of the various parts, as more fully hereinafter described.

Figure 1:
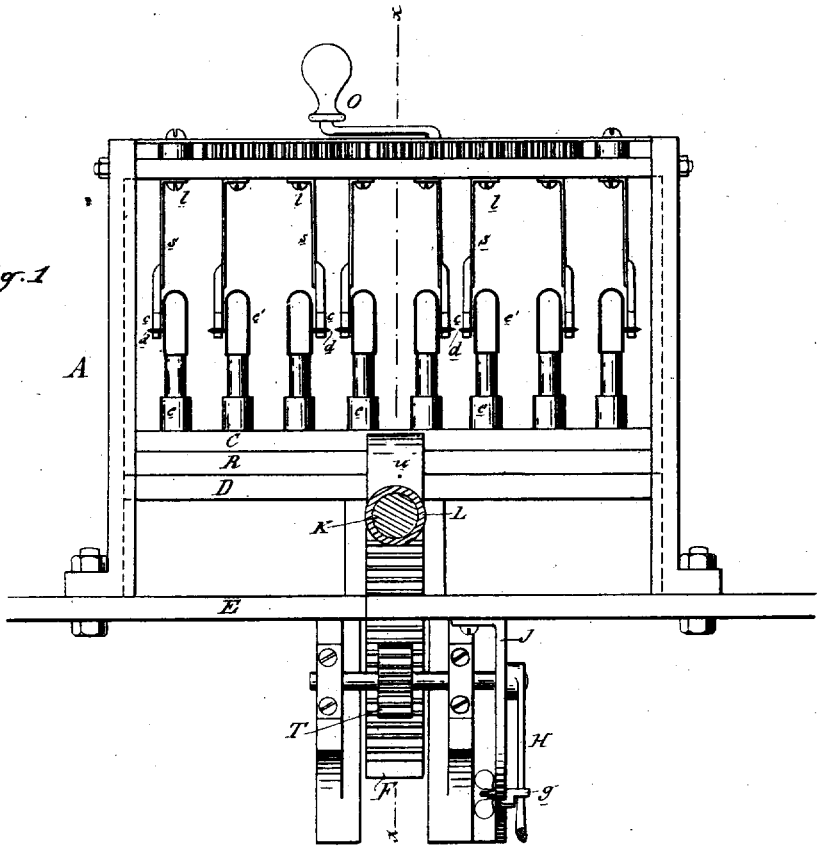
Figure 2:
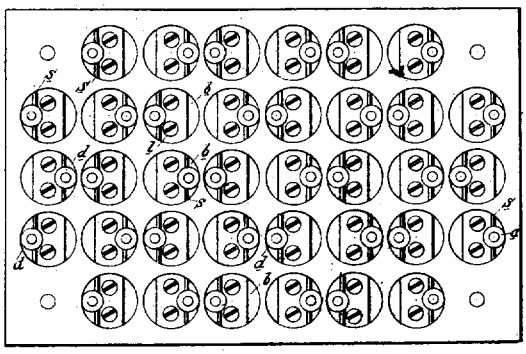

Figure 1 is a front elevation of my improved machine. Fig. 2 is a plan view of the upper plate, showing the knives in their position after the crank O, Fig. 1, has been turned half round. Fig. 3 is a vertical cross-section on the line *x x*, Fig. 1. Fig. 4 is a plan view of a set of molds. Fig. 5 is a plan view of the upper plate of the machine, showing the cog-wheels in their position. Fig. 6 is an enlarged view of one of the cutters and molds, showing the capsule cut off and prepared for removal from the mold.

Like letters refer to like parts in each figure.

In the accompanying drawings, which form a part of this specification, A represents a suitable frame, resting upon the base E, to support the operating parts of my improved machine. D is a platform, supported upon the upper end of the rack-bar F, and has a vertical motion by means of the pinion T engaging with said rack-bar, and operated by the lever H. By means of the segment J and set-screw *g* this platform is secured at any desired elevation. To this platform, so that it will have a vertical motion with it, is secured the arm K, carrying the hollow arm L, and the screw N, operated by the crank S, so arranged that the screw will withdraw or advance the mold-carrying slides R C. The capsule-molds *e* are secured in a vertical position and at regular intervals to the top of the plate or slide C by nuts *i*, let into proper recesses in the plate or slide R. The arm L is provided with a projection, *u*, so arranged that it may be turned down to allow the plates R C to be inserted and then turned up to rest against the edges of said plates.

In the top of the frame there is journaled a series of small drums, *b'*. To each of these drums is secured a pinion, *b*, arranged to engage with each other, as shown in Fig. 5, those in the center engaging with the pinion *a*, which receives motion from the crank O, and communicating such motion by the engaging-pinions to the drums *b'*. The latter should correspond in number to the number of molds employed on the plates R C, and must be placed with like regular intervals between them. To the lower side of each of these drums there is secured, by the screw *l*, a downwardly-projecting spring-arm, *s*, carrying at its free end a cutter-head, *c*, to which is secured a rotary or circular-shaped cutter, *d*. The object in view in using a spring-arm is that such spring-arm, set as shown in Fig. 3, when not in use, will compel the cutter to operate as shown in Fig. 6.

In practice, the molds *e*, secured, as described, substantially, to the plates R C, are withdrawn from the frame by turning down the projection *u*, and they are then immersed to the proper depth in the gelatine prepared for the purpose. After the molds have received a coating of the gelatine of sufficient thickness to make the capsules the slides R C are placed on the platform D in such position that each of the molds is presented to the spaces between the cutters. Then these molds are raised to the required height within the spaces between the cutters, such height bringing the cutters opposite the point where the capsules are to be cut off. Then the crank S is rotated, forcing the projection *u* against the plates R C and pressing the molds against the cutters, as shown in Figs. 1 and 6. Then the crank O is rotated, which, by the devices hereinbefore described, causes the cutters to perform their office, as shown in the latter figure. After the cut has been made, and while the motion of the cutters is still continued, the molds are again forced upward, and by this operation the tag or cut-off portion $e^2$ is forced away from the capsule $e^1$.

By the means described it will be seen that I am able to produce capsules of uniform length, varying such length as may be required without changing any of the parts of my machine.

I do not claim the mold *e*, upon which the capsules are formed, nor do I claim the composition of the gelatine of which they are made, as these form no part of my invention; but

What I claim as my invention, and desire to secure by Letters Patent, is—

1. In a machine for cutting off capsules, the combination of the series of molds *e* and the rack, pinion, and lever F T H, for the purpose of regulating the length of the capsules, substantially as described.

2. In a machine for cutting off capsules, the combination of the sliding plate, adapted to hold the series of molds, and the screw mechanism L K N, for the purpose of forcing the molds against the knives, substantially as described.

3. In a capsule-cutting machine, a series of rotary cutters operated by a crank and pinion acting upon pinions, one of which is attached to each of said cutters, substantially as specified.

4. In a capsule-cutting machine, the rotary cutters, driven by gearing, substantially as described, and supported upon spring-arms, substantially as and for the purposes set forth.

5. In a machine for cutting off capsules, the combination of the sliding plates, adapted to hold the molds of the rack, pinion, and lever F T H, and the screw mechanism K L N, for the purpose of giving both a lateral and vertical motion to the sliding plates, substantially as described.

6. The plate R C, in combination with a series of capsule-molds secured thereto at regular intervals, substantially as and for the purposes set forth.

FREDERICK A. HUBEL.

Witnesses:

H. S. SPRAGUE,

A. BARTHEL.